United States Patent Office 3,647,763
Patented Mar. 7, 1972

---

3,647,763
CHAIN EXTENDED POLYAMINE RESIN COMPOSITIONS
Hans H. Stockmann, Plainfield, and Dilip K. Ray-Chaudhuri, Somerset, N.J., assignors to National Starch and Chemical Corporation, New York, N.Y.
No Drawing. Continuation-in-part of application Ser. No. 734,894, June 8, 1968. This application Apr. 13, 1970, Ser. No. 27,999
Int. Cl. C08g 20/38
U.S. Cl. 260—78 SC                                    1 Claim

ABSTRACT OF THE DISCLOSURE

High molecular weight, chain extended copolyamide-polyamine resin compositions comprising the reaction product of a chain extension reagent with a copolyamide-polyamine intermediate which comprises the reaction product of a lactone or an alkylester of acrylic or methacrylic acid, a polyalkylene polyamine and a carboxylic acid reagent. The resulting resin compositions display great versatility in various applications such, for example, as flocculants, and as wet strength and pigment retention additives in the paper making process.

RELATED APPLICATIONS

This application is a continuation-in-part of our co-pending application Ser. No. 734,894, filed June 8, 1968 and assigned to the assignee of the instant application.

BACKGROUND OF THE INVENTION

In the preparation of paper, various materials are admixed with the paper stock prior to the formation of the sheet or are applied to the surface of the finished sheet in order to impart desired characteristics thereto. Thus, for example, wet strength additives are often employed in order to improve upon the tensile strength properties of paper sheets, while pigment retention aids are also often employed in order to retain the opacifying pigments present within the paper sheet.

Commercial wet strength resins which are presently available do not function effectively at alkaline pH levels. As a consequence, many grades of paper made on the alkaline side in order to attain strength and softness cannot be wet-strengthened. Furthermore, the low pH levels which are required in order to effectively use the acid-curing wet strength resins presently available cause dramatic increases in machine corrosion and maintenance costs.

Numerous materials have also been, heretofore, used as pigment retention aids such, for example, as hydrated aluminum sulfate, polymers such as polyacrylamide, and cationic polyamides, and various cationic starches. Despite their widespread use, many of these prior are retention aids exhibit a number of deficiencies in the paper making process particularly with respect to the fact that, under the acid conditions which prevail in many paper making operations, the cationic materials lose much of their ability to function as pigment retention aids. On the other hand, retention agents which are inherently anionic in nature are not effective when paper is made under neutral or alkaline conditions. In addition, it may be noted that although many presently available materials provide acceptable results as pigment retention agents, they do not, however, impart any strength to the paper and their use does, in fact, lead to a decided decrease in the tensile or bursting strength of the paper into which they have been incorporated.

SUMMARY OF THE INVENTION

It is, thus, the prime object of this invention to provide novel chain extended, high molecular weight copolyamide-polyamine resin compositions. A further object involves the use of these novel compositions as flocculants for organic and inorganic particles and also as wet strength and pigment retention additives in the paper making process. An additional object involves the preparation of resin compositions which are equally operable in a paper making process under both acidic and alkaline conditions. Various other objects and advantages of this invention will be apparent from the discussion which follows hereinafter.

Thus, the products of this invention comprise the chain extended cationic resins resulting from the reaction of a crosslinking agent, i.e. a chain extension reagent, with an intermediate copolyamide-polyamine composition which is produced by means of a condensation copolymerization technique involving a lactone or an alkyl ester of acrylic or methacrylic acid, a polyalkylene polyamine and a carboxylic acid reagent. It should be noted that it is exceedingly difficult to present an accurate structural formula of these compositions. Thus, as the chain extension reaction proceeds and an increasing amount of crosslinking occurs, the resulting products exhibit a polymeric configuration which is far too complex to be accurately depicted.

Paper containing the novel resins of this invention is characterized by its improved dry and wet strength as well as by its substantially increased capacity to retain pigments. Such paper products also exhibit increased retention of many other materials which may be included therein such, for example, as ketene dimer and wax emulsion sizing agents, thermoplastic resin dispersions, asphalt, carbon black and dyes, etc. Moreover, these resins are fully operable under alkaline as well as acid conditions, although they are preferably utilized in alkaline pulp systems. Furthermore, they need be used only in relatively small concentrations in order to provide the desired improvements and excellent results are obtained regardless of whether they are added to the pulp dispersion prior to the formation of the paper sheets or are subsequently applied to the surface of the finished paper sheet.

DESCRIPTION OF THE PREFERRED EMBODIMENT

In brief, the procedure for preparing the novel cationic resins of this invention comprises the steps of (1) reacting at least one polyalkylene polyamine with at least one lactone or an alkyl ester of acrylic or methacrylic acid;
(2) reacting the resulting polyamine-lactone or polyamine ester adduct with at least one carboxylic acid reagent; and
(3) chain extending the resulting copolyamide-polyamine intermediate by reacting it with a suitable cross-linking agent.

The polyalkylene polyamine compounds applicable for use in the process of this invention correspond to the formula

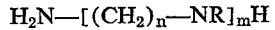

$$H_2N-[(CH_2)_n-NR]_mH$$

wherein $n$ is an integer having a value of from 2 to 6 inclusive, $m$ is an integer having a value of from 1 to 6 inclusive, and R is selected from the group consisting of hydrogen atom and alkyl radical. When R is an alkyl radical it is mere appendage on the molecule and has no effect on the reaction.

Thus, among the preferred applicable polyamine compounds are included: Ethylenediamine, diethylenetriamine, triethylenetetramine, tetraethylenepentamine, pentaethylenehexamine, hexamethylenediamine, bis-(triethylene) triamine, bis-hexamethylene-triamine, etc. to repetitive units reading 100, piperazine, and substituted piperazines.

It should be noted that more than one of the polyamines corresponding to the above formula may be simultaneously utilized in the reaction system. Thus, if desired, the practitioner may utilize crude residues containing mixtures of amines, e.g. those residues resulting from the interaction between dichloroethane and ammonia, as the polyamine starting material for the novel process of this invention. It should be further noted that when the above depicted polyalkylene polyamine compound is one which contains two or more primary amine groups of the value of $m$ exceeds about 8, it is highly likely that it will exhibit a branched configuration; such branched polyamines also are deemed readily applicable for use in the process of this invention.

The lactone compounds which are applicable for use in the process of this invention correspond to the formula

wherein R is a saturated, aliphatic, straight chain hydrocarbon radical containing from 2 to 18 carbon atoms, and wherein the ring formed by the carbonyl carbon atoms, the oxygen atom and the carbon atoms of the R radical is one which contains from 4 to 20 members. Thus, for example, beta-propiolactone, i.e.

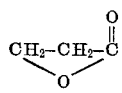

exhibits a four membered ring, while omega-pentadecanolactone, i.e.

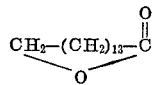

exhibits a 16 membered ring. Among the applicable lactones are included: Beta-propiolactone, beta-butyrolactone, gammabutyrolactone, gamma-isocrotonolactone, gamma-valerolactone, delta-valerolactone, epsilon-caprolactone, gamma-caprylolactone, omega-caprylolactone, gamma-decanolactone, omega-laurolactone, and omega-pentadecanolactone. The beta-lactones are preferred for purposes of this invention.

The esters applicable for use in the process of this invention correspond to the formula

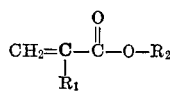

wherein $R_1$ is a hydrogen or methyl and $R_2$ is an alkyl radical having 1 to 4 carbon atoms. Thus, the esters are alkyl esters of acrylic or methacrylic acid, e.g. methacrylate, ethylacrylate, methyl methacrylate, and butyl acrylate.

The carboxylic acid component applicable for use in the process of this invention may be selected from the group consisting of saturated dicarboxylic acids containing from about 2 to 20 carbon atoms; unsaturated dicarboxylic acids containing from about 4 to 36 carbon atoms; alicyclic dicarboxylic acids; aromatic dicarboxylic acids; alpha, beta-unsaturated monocarboxylic acids; and, esters and anhydrides of these carboxylic acids. Specific acids which are representative of each of these groups include: Adipic acid, dimethyl adipate, succinic acid, succinic anhydride, glutaric anhydride, azelaic acid, sebacic acid, suberic acid, isosebacic acid, diglycolic acid, gamma, gamma'-oxydibutyric acid, phthalic acid, phthalic anhydride, isophthalic acid, terephthalic acid, dimethyl terephthalate, diphenic acid, cyclopentane-1,3-dicarboxylic acid, cyclohexane-1,3-dicarboxylic acid, cyclohexane-1,4-dicarboxylic acid, fumaric acid, maleic acid, dimethyl maleate, maleic anhydride, itaconic acid, citraconic acid, mesaconic acid, dimer fatty acid prepared by dimerization of $C_{18}$ unsaturated fatty acid, acrylic acid and methacrylic acid, etc.

The applicable chain extension agents are polyfunctional materials which are capable of reacting with amine groups in order to provide the desired crosslinking. Proper selection of these agents will enable the practitioner to prepare either thermosetting or thermoplastic resin products, e.g. the use of an epihalohydrin reagent will provide thermosetting resins while the use of 1,2-dichloroethane will provide non-thermosetting types. Among such chain extension agents are included: Epihalohydrins such as epichlorohydrin, halohydrins, 1,2-dichloroethane, 1,2-dichloropropane, 1,2-dichlorobutane, divinyl sulfone, divinyl ether, methylene-bis-acrylamide, diallylamine, diallylmelamine, glyoxal, acrolein, crotonaldehyde, glycidylaldehyde, diglycidyl ether, sulfur dichloride, sulfuryl chloride, phosphorus oxychloride, phosphorus trichloride and 1,4-dichlorobutene, etc. While the epihalohydrins and the dichloroalkanes are preferred for use in the chain extension reaction of this invention, the other listed reagents are also known for their reaction with amines and, accordingly, are equally applicable for use.

In more detail, the procedure for the preparation of the novel cationic resins of this invention comprises slowly admixing, preferably in a stream of inert gas such as nitrogen, the polyamine reagent and the lactone or ester of acrylic or methacrylic acid, and, thereafter, heating the resulting mixture at a temperature from about 0 to 390° C., and preferably from about 50 to 100° C., for a period of about ½ to 3 hours. Needless to say, the time of the reaction will depend on the reaction temperature which is utilized as well as on the specific nature of the reactants, although the above noted reaction period is usually sufficient to insure completion of the reaction. Completion of the reaction can be determined by following the disappearance, when a lactone is used, of the lactone carbonyl absorption band on an infra-red spectrum of the end product. Completion of the reaction, when an ester is used, can be determined by following the disappearance of the unsaturation absorption band on an infrared spectrum of the end product. Furthermore, the reaction may, if desired, be conducted in the presence of water, although its presence is not essential to the process of this invention.

Upon completion of this initial reaction, the temperature of the mixture is lowered to a level of about 15 to 25° C. whereupon the carboxylic acid component is admixed therewith. The temperature is then increased to a level of about 100 to 275° C. and the reaction allowed to proceed for a period of about ½ to 4 hours. As in the initial reaction, variations in temperature and pressure may be used with a corresponding increase or decrease in the duration of the reaction. Additionally, small amounts of water may be present in the system in order to facilitate the reaction procedure. The reaction is discontinued at the point when the resulting copolyamide-polyamine intermediate exhibits the desired intrinsic viscosity; the latter characteristic being determined in methanol and being indicative of the molecular weight of the cationic polymer.

In order to insure the formation of the desired high molecular weight intermediates, aspiration may be applied to the reaction system for a period of about five to fifteen minutes while the temperature is maintained at a level above the melting point of the desired reaction product. In most instances, the resulting cationic polymeric intermediates are hard, brittle products which are generally soluble in both water and alcohol.

With respect to proportions, the determination of the precise concentration of the three primary ingredients involved in the preparation of the cationic intermediates, as based on the stoichiometric equivalencies of the reactions, is left to the discretion of the practitioner and will depend, of course, on the characteristics which are desired in the copolyamide-polyamine intermediate. In most instances, however, the molar proportions of lactone or alkyl ester of acrylic or methacrylic acid:carboxylic acid:polyamine utilized will range from about 0.01:0.99:1.5 to 1.0:0.01:1.0

The use of the required reagents within the latter range of concentrations thereby insures sufficient reaction with the primary amine groups of the polyamine, proper control of the subsequent chain extension reaction and the formation of high molecular weight resins.

Thereafter, the thus prepared intermediate is dissolved in either water or a water-alcohol mixture, the resulting solutions having a solids content of from about 5 to 50%, by weight. The water-alcohol mixtures which are used may contain from about 10 to 50%, by weight, of such aliphatic alcohols as methanol, ethanol, propanol and isopropanol. The selected chain extension reagent is then admixed with the polymer solution and the reaction is allowed to proceed at a temperature of about 30 to 100° C., the concentration of chain extension agent being dependent upon the molecular size of the cationic intermediate. The chain extension reaction is deemed completed when the desired viscosity of the reaction mix is attained; the latter viscosities varying from A to Z on the Gardner-Holdt scale. When this desired viscosity is reached, the resin solution is cooled, diluted with water and then stabilized by adding sufficient acid to reduce its pH to a level of about 1.5 to 6.0. Any suitable organic or inorganic acid such as hydrochloric, sulfuric, nitric, oxalic and acetic acids may be utilized to stabilize the resulting product. However, such stabilizing procedures are not required when the chain extended product is non-thermosetting in nature. In either instance, the resulting products are high molecular weight, cationic resin compositions.

As previously indicated, the novel resins of this invention function as excellent wet strength additives, pigment retention and drainage aids in the paper making process, and as flocculating agents for both organic and inorganic solids. Of great importance, they provide these characteristics over a wide range of operating conditions.

Furthermore, it should be noted that the novel chain extended resins of this invention may be effectively utilized, in the paper-making or external paper-treating process, in conjunction with conventional paper additives such, for example, as starches, starch derivatives, cellulosic derivatives, polyvinyl alcohol and gums, thereby resulting in the preparation of total paper products.

Our novel resins may be employed in any of the conventional methods of preparing paper sheets and other paper products. The preferred method for incorporating these resins, whether they be in solution, emulsion or other dispersed form, is by internal addition to the cellulosic pulp material prior to the formation of the solid paper sheet. Thus, an aqueous solution of the resin may be added to an aqueous suspension of the paper stock while the latter is in the head box, beater, hydropulper, stock chest or at any other point in the paper making process prior to the point of sheet formation. Among the variety of pulps which may be effectively treated are included: Bleached and unbleached sulfate (kraft), bleached and unbleached sulfite, bleached and unbleached soda, neutral sulfite, semi-chemical, chemi-groundwood, hardwood or any combination of these fibers. These designations refer to wood pulp fibers which have been prepared by means of a variety of processes which are known in the pulp and paper industry. In addition, synthetic fibers of the viscose rayon, regenerated cellulose, polyamide or polyester type can also be used. It is essential to note that the latter pulp slurries may be maintained over a wide range of pH levels, i.e. from about 4 to 11, and still be effectively treated by the novel resins of this invention.

Thereafter, the sheet is formed, pressed in order to reduce its moisture content and dried by conventional means, the latter drying operation serving to cure the resin to its polymerized and water-insoluble state. The curing procedure may be conducted under acid, neutral or alkaline conditions, although such factors as optimum performance and minimum corrosion suggest that the curing step be conducted at pH levels ranging from about 6 to 9.

In practice, our novel resins are generally added to the pulp slurry in amounts ranging from about 0.01 to 5.0%, based on the dry weight of the pulp. Within this preferred range, the precise amount will depend upon the type of pulp being used, the specific operating conditions and on the characteristics desired in the finished paper product.

Our novel resins may also be applied to the finished paper stock by a variety of immersion and spraying techniques. Thus, for example, a paper sheet may be immersed in an aqueous solution of the resin, whereupon the treated sheet is cured by being heated at a temperature of about 40 to 150° C. for a period of about ½ to 180 minutes. The resulting papr sheets exhibit greatly increased wet strength properties and, thus, this procedure is especially well suited for the impregnation of paper towels, absorbant tissue, wrapping paper, bag paper and the like.

With regard to the pigment retention properties of our resins, they have been found to facilitate such retention by causing the ultra-fine particles which are present in the fiber slurry to be deposited on and adhered to the fibers. Among the minute particles that may be deposited in this manner are included pigments such as clay, calcium carbonate, ultramarine and titanium dioxide; rosin size; emulsion particles; and, cellulosic "fines." As previously indicated, our novel resins are effective as retention aids over a wide range of pH levels and at relatively small concentration levels.

The novel resins of this invention may also be utilized as filtration aids and flocculants for both organic and inorganic materials in various applications which include the treatment of industrial waste and process streams, mining and metallurgical processes, for sewage treatment, and for water clarification and purification. In practice, the flocculation procedure is typically conducted by the addition of the aqueous resin solution to the suspended, finely divided solid materials. The concentration of active resin to be employed will vary according to the degree of fineness of the suspended solids, the chemical nature of such solids and the particular resinous composition being employed. Typical values range from about 1 to 10,000 parts of resin per each million parts, by weight, of solids in suspension. Thereafter, the resulting flocs are separated from their aqueous media by means of a settling out, filtration or decantation operation. The distinct advantages derived from the use of our novel products are to be found in the rapid settling rates, low residual turbidities, and large, non-gummy floc formation which accompany their use.

The following examples will further illustrate the embodiment of this invention. In these examples, all parts given are by weight, unless otherwise noted.

EXAMPLE I

This example illustrates the preparation of a high molecular weight, cationic resin typical of the products of this invention.

A reaction vessel fitted with a nitrogen inlet, a distillation apparatus and means for mechanical agitation was charged with 30.9 parts of diethylenetriamine and 5.4 parts of beta-propiolactone, the beta-propiolactone being added over a period of one hour. A slow stream of nitrogen was maintained during the reaction which proceeded at a temperature of 60 to 70° C. for an additional 30 minutes. Completion of the reaction was determined by monitoring the disappearance of the lactone-carbonyl absorption band on an infra-red spectrum of the product.

The reaction mixture was then cooled to 25° C. whereupon 38.4 parts of adipic acid and 30 parts of water were added thereto. A stream of nitrogen was passed through the system and the reaction allowed to proceed at a temperature of 195 to 200° C. for a period of two hours, the water formed as a by-product of the reaction being distilled from the system simultaneously therewith. Thereafter, suction was applied for a period of five minutes and the product cooled. The resulting copolyamide-polyamine intermediate was a hard, brittle, orange-colored polymer which exhibited an intrinsic viscosity, as determined in methanol at 25° C., of 0.135.

Finally, 8.5 parts of epichlorohydrin was added, over a 10 minute period, to an aqueous solution containing 15 parts of the thus prepared intermediate in 85 parts of water, the latter solution having been maintained at a pH level of 9.3 and a temperature of 50 to 55° C. The Gardner viscosity and the pH level of the system were measured during the course of the reaction. The reaction was complete after a period of 3½ hours at which point the Gardner viscosity reached a value of E and the pH had dropped to a level of 6.5. Thereupon, the reaction mix was cooled, diluted with 100 parts of water and stabilized at a pH of 5 by the addition of requisite amounts of a 10%, by weight, aqueous hydrochloric acid solution.

The above described procedure repeated under similar conditions produces like resins with the exception that:

(1) Diglycolic acid and 1,4-cyclohexane dicarboxylic acid are each, respectively, utilized as the carboxylic acid reagent;

(2) Omega-dodecanolactone and omega-caprylolactone are each, respectively, utilized as the lactone reagent;

(3) A mixture of amines comprising hexamethylene diamine, bis-hexamethylene triamine and higher homologues of each of the latter amines; and a polyethylene amine residue comprising a mixture of pentaethylenehexamine, diaminoethyl triaminoethylamine, diaminoethyl triethylenetetramine, aminoethyl piperazine and higher homologues of each of the latter polyethylene amines, are each, respectively, utilized as the polyamine reagent; and (4) Methylene-bis-acrylamide and sulfuryl chloride are each, respectively, utilized as the chain extension reagent. The reaction conditions are slightly altered to accommodate the different reagents.

EXAMPLES II TO X

These examples illustrate the wide variety of reagents and reaction conditions which can be efficiently utilized in the novel process of this invention.

A number of different cationic polymers were prepared according to the general procedure set forth in Example I, hereinabove, utilizing a variety of reagents at different concentration levels and under varying reaction conditions. These variables are presented in the following table wherein "Step 1" refers to the preparation of the copolyamide-polyamine intermediate and "Step 2" refers to the chain extension of the latter intermediates in order to prepare the desired high molecular weight cationic polymers.

STEP 1

| Intermediate number | Parts | | | | | | | |
|---|---|---|---|---|---|---|---|---|
| | II | III | IV | V | VI | VII | VIII | IX |
| 1. Adipic acid | | | 25.5 | 63.2 | 20.6 | 38.4 | 79.5 | 54.7 |
| 2. Succinic acid | 51.6 | | | | | | | |
| 3. Terephthalic acid | | 29.2 | | | | | | |
| 4. Diethylentriamine | 51.5 | | | | 53.0 | | 56 | 51.5 |
| 5. Ethylene diamine | | | | | | | 9.9 | |
| 6. Triethylene tetramine | | 29.2 | 29.2 | | | 43.8 | | |
| 7. A polyethylene amine residue comprising the non-volatile amine by-product of the reaction between ethylene dichloride and ammonia | | | | | 50 | | | |
| 8. Beta-propiolactone | 18 | 3.6 | | | 2.9 | 5.4 | 11.9 | 18.0 |
| 9. Beta-butyrolactone | | | | 10.5 | | | | |
| 10. Epsilon-caprolactone | | | 5.75 | | | | | |
| 11. Water | 50 | 50 | 50 | 50 | 30 | 50 | 50 | 50 |
| a. Time of reaction of amine and lactone (hour) | 1 | ½ | 1½ | 1½ | ½ | ½ | 1¼ | 1½ |
| b. Temperature of reaction of amine and lactone (° C.) | 60–70 | 60–70 | 60–70 | 60–70 | 60–70 | 60–70 | 60–70 | 60–70 |
| c. Time of reaction of amine-lactone adduct and carboxylic acid (hour) | 2 | 2½ | 2½ | 2 | 1 | 2 | 2 | 2 |
| d. Temperature of reaction of amine-lactone adduct and carboxylic acid (° C.) | 185–190 | 240–250 | 185–190 | 185–190 | 185–190 | 185–190 | 185–190 | 185–190 |
| e. Intrinsic viscosity of copolyamide-polyamine intermediate as determined in methanol at 25° C. | 0.17 | 0.065 | 0.12 | 0.08 | 0.13 | 0.19 | | 0.087 |

STEP 2

| Example number | Parts | | | | | | | | |
|---|---|---|---|---|---|---|---|---|---|
| | II | III | IV | V | VI | VII | VIII | IX | X |
| 1. Intermediate II | 15 | | | | | | | | |
| 2. Intermediate III | | 15 | | | | | | | |
| 3. Intermediate IV | | | 15 | | | | | | |
| 4. Intermediate V | | | | 15 | | | | | |
| 5. Intermediate VI | | | | | 15 | | | | |
| 6. Intermediate VII | | | | | | 15 | | | |
| 7. Intermediate VIII | | | | | | | 15 | | |
| 8. Intermediate IX | | | | | | | | 15 | 25 |
| 9. Epichlorohydrin | 8.37 | 12.0 | 9.2 | 9.5 | | 12.7 | | 7.6 | 16.2 |
| 10. 1,2-dichloroethane | | | | | 7.05 | | 7.05 | | |
| 11. Water | 85 | 42.5 | 85 | 85 | 85 | 85 | 85 | 75 | 75 |
| 12. Isopropanol | | 42.5 | | | | | | | |
| a. Initial pH level of reaction mixture | 10.2 | 10.3 | 11.6 | 9.5 | 9.6 | 10.2 | 10.2 | 10.6 | 9.7 |
| b. Addition period of chain extension agent (minutes) | 7 | 5 | 10 | 10 | 5 | 7 | 5 | 5 | 10 |
| c. Total reaction time (minutes) | 150 | 225 | 640 | 590 | 600 | 200 | 230 | 240 | 300 |
| d. Reaction temperature (° C.) | 50–53 | 60 | 60 | 60 | 90–95 | 60 | 90–95 | 60 | 60 |
| e. Gardner viscosity | E–F | E | H | E | F | F | E | D | E |
| f. Final pH level of reaction mixture | 7 | 7.8 | 6.4 | 6.8 | 8.5 | 7.2 | 8.7 | 6.9 | 6.8 |
| g. pH level of stabilized resin | 5 | 5 | 5 | 5 | [1] 8.5; 6.0; 3.5 | [2] 5 | [1] 8.7; 6.0; 3.5 | 5 | 5 |

[1] Final reaction mixture was divided into three parts and adjusted to the specified pH levels with hydrochloric acid.
[2] Final reaction mixture was divided into three parts with hydrochloric, nitric and sulfuric acids each being respectively utilized to adjust the pH of one of the fractions to a level of 5.

The data presented hereinabove clearly indicate the effectiveness of the novel process of this invention in the utilization of a wide range of reagents and reaction conditions.

EXAMPLE XI

This example illustrates the preparation of a typical copolyamide-polyamine and its chain extended product of this invention, which was prepared utilizing an alkyl acrylate.

A total of 309 parts of diethylenetriamine was charged into a reaction vessel equipped with a nitrogen inlet, means for mechanical agitation, a thermometer, a condenser fitted with an ascarite tube, and a dropping funnel. Thereafter, 64.5 parts of methyl acrylate was slowly added to the diethylenetriamine at 25° C. over a period of about 30 minutes. The reaction of the methyl acrylate and diethylenetriamine is exothermic, thus by the end of the addition the temperature of the mixture was 32° C. The temperature was raised to 58° C. and the reaction was continued at that temperature for about 75 minutes. The reaction mixture was cooled to about 20 to 25° C. whereupon 50 parts of water and 381 parts of adipic acid were charged thereto. A slow stream of nitrogen was passed and the reaction allowed to continue at about 160 to 177° C. for a period of about 1½ hours. During this period water and methanol, formed as by-products of the reaction, were distilled off. Thereafter, suction was applied to the system for a period of 5 minutes and the product was cooled. The resulting product was a hard, brittle, orange-colored, highly hydroscopic polymer which had an intrinsic viscosity of 0.15 when measured in methanol at 25° C.

Finally, 100 parts of the above copolyamide-polyamine was dissolved in 566 parts of water and the resulting solution was charged into a reaction vessel fitted with a mechanical stirrer, a thermometer, a dropping funnel and a condenser. To this was added 56.5 parts of epichlorohydrin slowly over a period of 12 minutes at about 45 to 59° C. The reaction was continued at the same temperature for a period of 2½ hours at which point the viscosity of the mixture reached I-J values in the Gardner-Holdt scale and the pH had dropped from 9.5 to 6.7. Thereupon, the reaction mixture was cooled, diluted with 800 parts of water and the pH adjusted to a value of about 5 with 25% nitric acid.

EXAMPLES XII TO XVIII

These examples illustrate the additional reagents and reaction conditions which can be efficiently utilized in the novel process of this invention.

A number of different cationic polymers were prepared according to the general procedure set forth in Example XI, utilizing a variety of reagents at different concentration levels and under varying reaction conditions. These variables are present in the following table wherein "Step 1" refers to the preparation of copolyamide-polyamine intermediate and "Step 2" refers to the chain extension of the intermediate to a high molecular weight polymer.

STEP 1

| Intermediate number | Parts | | | | | |
|---|---|---|---|---|---|---|
| | XII | XIII | XIV | XV | XVI | XVII |
| 1. Adipic acid | 82.10 | 45.60 | 38.3 | 63.8 | 109.5 | 126 |
| 2. Isophthalic acid | | 20.75 | | | | |
| 3. Diethylenetriamine | 51.50 | 51.50 | 51.5 | 38.6 | 103 | 103 |
| 4. Ethylenediamine | | | | 7.5 | | |
| 5. Hexamethylenetriamine | 26.9 | | | | | |
| 6. Methyl acrylate | 10.75 | 10.75 | 32.20 | 11.75 | 43 | |
| 7. Ethyl acrylate | | | | | | 25 |
| 8. Water | 30 | 30 | 30 | 30 | 50 | 50 |
| a. Time of reaction of amine and acrylate (hours) | 2 | 2 | 2 | 2 | 3 | 1 |
| b. Temperature of reaction of amine and acrylate (° C.) | 25-62 | 25-62 | 25-61 | 25-60 | 25-53 | 40-65 |
| c. Time of reaction of amine-acrylate adduct and dicarboxylic acid (hours) | 2 | 2 | 2 | 2 | 1½ | 1½ |
| d. Temperature of reaction of amine-acrylate and dicarboxylic acid (° C.) | 156-170 | 156-170 | 156-170 | 156-170 | 156-170 | 156-170 |
| e. Reduced viscosity of 1% solution in methanol at 25° C | 0.14 | 0.07 | 0.085 | 0.09 | .11 | 0.10 |

STEP 2

| Example number | Parts | | | | | | |
|---|---|---|---|---|---|---|---|
| | XII | XIII | XIV | XV | XVI | XVII | XVIII |
| 1. Copolyamide-polyamine from Example XI | 100 | | | | | | |
| 2. Intermediate XII | | 50 | | | | | |
| 3. Intermediate XIII | | | 50 | | | | |
| 4. Intermediate XIV | | | | 50 | | | |
| 5. Intermediate XV | | | | | 49.4 | | |
| 6. Intermediate XVI | | | | | | | 50 |
| 7. Intermediate XVII | | | | | | 30 | |
| 8. Epichlorohydrin | 67 | 19-85 | 21.9 | 28.3 | 28.2 | 16.1 | |
| 9. 1,2-dichloroethane | | | | | | | 23.5 |
| 10. Water | 566 | 283 | 283 | 283 | 279.6 | 170 | 333 |
| a. Initial pH level of reaction mixture | 9.5 | 9.3 | 9.8 | 10.2 | 10.1 | 9.4 | 10.1 |
| b. Addition period of chain extension agent (minutes) | 2 | 30 | 40 | 7 | 37 | 8 | 5 |
| c. Total reaction time (minutes) | 158 | 195 | 560 | 600 | 202 | 305 | 310 |
| d. Reaction temperature (° C.) | 23-57 | 25-58 | 50-64 | 27-60 | 42-62 | 56-70 | 90-95 |
| e. Gardner viscosity | E | E-F | E | F | F | E | E-F |
| f. Final pH level of reaction mixture | 7.5 | 7.1 | 7.8 | 5.8 | 6.5 | 5.6 | 8.1 |
| g. pH level of stabilizer resin | 5.0 | 5.0 | 5.0 | 5.0 | 5.0 | ¹ 5.0 | ² 8.1;6.0 |
| h. Solids content of stabilized resin (percent) | 10.02 | 10.84 | 11.72 | 10.93 | 10.4 | 10.1 | 10.2;10.3 |
| i. Gardner viscosity of stabilized resin | A | B-C | A-B | C | B-C | A-B | B-C;A-B |

¹ pH was adjusted with 10% HCl.
² Final reaction mixture was divided into two parts and adjusted to the specified pH levels with 25% nitric acid.

The data presented hereinabove clearly indicate the effectiveness of the novel process of this invention in the utilization of a wide range of reagents and reaction conditions.

EXAMPLE XIX

This example illustrates the excellent wet strength exhibited by paper which has been modified by the addition, thereto, of the novel cationic resins of this invention.

The following procedure was employed in order to demonstrate the excellent wet strength characteristics imparted to paper by the novel resins of this invention. Thus, the specified concentration of resin solution was admixed with 3000 milliliters of an aqueous slurry of a beaten bleached sulfate pulp which had been adjusted to a consistency of 0.5%, by weight, and which was at a pH level of 7.5. Paper sheets whose dimensions were 12″ x 12″ were then prepared from each of the slurries utilizing the William's Standard Sheet Mold. The resulting sheets were squeezed in a press which applied a pressure of 2000 pounds per square inch for a period of two minutes, whereupon the sheets were dried at a temperature of 120° C. for a period of 8 to 10 minutes. A portion of each sheet was then cured at a temperature of 100° C. for one hour.

Sections of both the cured and uncured paper sheets, which were ½″ wide and 6″ long, were immersed in water for a period of 30 minutes, these sections serving as the wet strength test specimens. Strips ½ inch in width were then cut from the various specimens and were subjected to a pulling force of 2 inches per minute on an Instron Tensile Tester in order to measure the force necessary to tear the paper specimens.

The results of these determinations are presented in the following table:

TABLE

| Resin Example number | Percent of resin based on dry wt. of pulp | Dry strength, lbs./inch | | Wet strength, lb./inch | |
|---|---|---|---|---|---|
| | | Uncured | Cured | Uncured | Cured |
| Control [1] (no resin added) | | 49 | 49.2 | 0.6 | 0.8 |
| I | 1.00 | 54.4 | 60.6 | 13.6 | 18.6 |
| | 0.50 | 48.6 | 56.2 | 13.4 | 16.2 |
| | 0.25 | 45.6 | 55.2 | 8.6 | 13.8 |
| VII (pH adjusted with HCl) | 1.00 | 50.0 | 66.2 | 14.8 | 18.2 |
| | 0.50 | 45.8 | 56.4 | 9.8 | 13.6 |
| | 0.25 | 55.6 | 54.0 | 7.6 | 10.6 |
| VII (pH adjusted with $H_2SO_4$) | 1.00 | 51.0 | 58.0 | 14.0 | 16.8 |
| | 0.50 | 44.4 | 53.4 | 10.6 | 14.0 |
| | 0.25 | 48.4 | 51.4 | 7.6 | 9.8 |
| VII (pH adjusted with $HNO_3$) | 1.00 | 53.6 | 58.2 | 12.8 | 19.4 |
| | 0.50 | 39.6 | 53.6 | 8.4 | 14.2 |
| | 0.25 | 48.4 | 54.6 | 8.4 | 10.8 |
| IV | 1.00 | 51.4 | 55.0 | 11.6 | 15.0 |
| | 0.50 | 52.4 | 53.6 | 8.8 | 9.4 |
| | 0.25 | 53.4 | 59.4 | 6.0 | 8.8 |
| Control [1] (no resin added) | | 44.6 | 50.6 | 0.8 | 1.2 |
| II | 1.00 | 56.8 | 58.0 | 12.4 | 15.4 |
| | 0.50 | 52.4 | 52.6 | 9.0 | 13.2 |
| Control [1] (no resin added) | | 54.4 | 53.6 | 0.8 | 1.0 |
| V | 1.00 | 54.8 | 60.0 | 10.6 | 17.6 |
| | 0.50 | 52.4 | 61.6 | 8.6 | 13.6 |
| | 0.25 | 49.4 | 59.8 | 5.4 | 10.4 |
| VII | 1.00 | 46.0 | 57.4 | 9.0 | 16.0 |
| | 0.50 | 49.8 | 64.8 | 8.2 | 11.2 |
| | 0.25 | 44.0 | 59.8 | 4.8 | 10.4 |
| Control [1] (no resin added) | | 44.6 | 50.6 | 0.8 | 1.2 |
| III | 1.00 | 56.8 | 58.0 | 12.4 | 17.4 |
| | 0.50 | 52.4 | 52.6 | 9.0 | 13.2 |

[1] In order to present valid comparative results, a control was included with each test series.

The results summarized above clearly indicate the improved dry and wet tensile strength imparted to paper by the novel resins of this invention.

EXAMPLE XX

This example illustrates the excellent pigment retention properties imparted to paper by the novel cationic resins of this invention.

The following procedure was employed in order to demonstrate the pigment retention properties exhibited by paper sheets which had been treated with the novel resins of this invention. Thus, an aqueous suspension of bleached sulfite pulp was prepared at neutral pH and then beaten to a consistency of 0.5%, by weight. A 10%, by weight, aqueous titanium dioxide suspension was then added to 3000 parts of the beaten pulp slurry, thereby providing the fiber slurry with 10% of titanium dioxide, based on the weight of the dry pulp therein. Upon adjusting the pH of the pigmented slurry to the desired level, a specified amount of resin solution was admixed therewith. The final dry paper sheet was then formed by means of the procedure set forth in Example XI.

Samples of the pigmented paper sheets which contained the respective pigment retention agents were then analyzed in order to determine their percent pigment retention; the latter determination being conducted by ashing the sheets and then calculating the percentage of the total weight of the sheet which was accounted for by the pigment concentration of the resulting ash.

The above described procedure was then repeated under similar conditions with the exception that calcium carbonate was substituted for the titanium dioxide pigment. In this instance, pigment retention was determined by digesting the treated paper sheet with excess hydrochloric acid and subsequently back titrating with sodium hydroxide.

The following table presents the results of these pigment retention analyses and indicates the particular pigment retention agents which were utilized, the concentration in which they were employed and the pH of the respective resin and pulp dispersions.

TABLE

| Resin example number | pH of the resin solution | Stock pH adjusted to a level of— | Percent resin, based on dry wt. of pulp | Retention of— | |
|---|---|---|---|---|---|
| | | | | $TiO_2$, percent | $CaCO_3$, percent |
| VI | 8.5 | 7.5 | 0.01 | 45.8 | |
| | | 7.5 | 0.02 | 62.7 | |
| | | 7.5 | 0.05 | 71.2 | |
| VI | 6.0 | 7.5 | 0.01 | 43.4 | |
| | | 7.5 | 0.02 | 63.3 | |
| | | 7.5 | 0.05 | 69.2 | |
| VI | 3.5 | 7.5 | 0.01 | 44.7 | |
| | | 7.5 | 0.02 | 60.4 | |
| | | 7.5 | 0.05 | 70.2 | |
| VI | 6.0 | 6.0 | 0.05 | 69.0 | |
| | | 4.6 | 0.05 | 65.1 | |
| VII [1] | 5.0 | 7.5 | 0.01 | 41.4 | |
| | | 7.5 | 0.02 | 56.4 | |
| | | 7.5 | 0.05 | 65.8 | |
| VIII | 8.7 | 7.5 | 0.01 | 37.0 | |
| | | 7.5 | 0.02 | 57.3 | |
| | | 7.5 | 0.05 | 68.5 | |
| VIII | 6.0 | 7.5 | 0.01 | 35.1 | |
| | | 7.5 | 0.02 | 55.3 | |
| | | 7.5 | 0.05 | 70.6 | |
| VIII | 3.5 | 7.5 | 0.01 | 33.2 | |
| | | 7.5 | 0.02 | 54.7 | |
| | | 7.5 | 0.05 | 70.5 | |
| VI | 8.5 | 8.8 | 0.01 | | 28.5 |
| | | 8.8 | 0.02 | | 52.1 |
| | | 8.8 | 0.05 | | 52.1 |
| Control (no resin added) | | 7.5 | | 15.8 | |
| Do | | 8.8 | | | 10.5 |

[1] pH adjusted with HCl.

The results summarized above clearly show the excellent pigment retention properties which are achieved with the novel resins of this invention.

EXAMPLE XXI

This example illustrates the use of the novel resins of this invention as flocculants in the process of clarifying digested sludge.

The flocculation properties of our novel resins were determined by admixing the specified resin solution with 200 milliliters of digested sludge containing 6%, by weight, of solids. The sludge, in this instance, consisted of storm sewer runoff as well as normal sanitary waste. The respective mixtures were then filtered under a reduced pressure of about 11 to 12 millimeters Hg. The volume of clear water which was obtained after specific time intervals was noted. The effectiveness of the resin as a flocculant is directly related to the volume of clear water obtained. As a control, a similar run was conducted utilizing a conventional inorganic flocculant system comprising a 1:8 weight mixture of ferric chloride and calcium oxide.

The following table presents the results of these various flocculation determinations and indicates the particular resins which were used and the concentrations in which they were employed.

TABLE

| Resin example number | pH of the resin solution | Percent resin based on dry wt. of sludge | Volume of clear water (ml.) collected after— | | |
|---|---|---|---|---|---|
| | | | 30 sec. | 60 sec. | 150 sec. |
| VI | 8.5 | 0.50 | 80 | 110 | 145 |
| | | 0.75 | 90 | 115 | 155 |
| VI | 6.0 | 0.50 | 74 | 105 | 148 |
| | | 0.75 | 83 | 110 | 156 |
| VI | 3.5 | 0.50 | 75 | 105 | 155 |
| | | 0.75 | 95 | 130 | 167 |
| VIII | 8.7 | 0.50 | 80 | 107 | 155 |
| | | 0.75 | 85 | 115 | 162 |
| VIII | 6.0 | 0.50 | 90 | 120 | 168 |
| | | 0.75 | 97 | 130 | 167 |
| VIII | 3.5 | 0.50 | 80 | 110 | 160 |
| | | 0.75 | 85 | 116 | 165 |
| Control | | ¹0.50 | 55 | 75 | 111 |
| | | ¹0.75 | 60 | 85 | 127 |

¹ Concentration of ferric chloride in mixture.

The results summarized above clearly indicate that the cationic polymers of this invention caused a major increase in the rate of filtration of the digested sewage.

EXAMPLE XXII

This example illustrates the excellent wet strength exhibited by paper which has been modified by the addition, thereto, of the novel cationic thermosetting resins of this invention.

The procedure employed was same as in Example XIX. The results of these determinations are shown in the following table:

TABLE

| Resin example number | Percent of resin, based on dry wt. of pulp | Dry strength, lb./in. | | Wet strength (lb./in.) | |
|---|---|---|---|---|---|
| | | Uncured | Cured | Uncured | Cured |
| Control¹ (no resin added) | | 44.2 | 43.6 | 0.80 | 0.70 |
| XI | 1.00 | 48.2 | 61.4 | 14.0 | 20.2 |
| | 0.50 | 49.8 | 49.4 | 11.2 | 15.4 |
| | 0.25 | 43.8 | 47.4 | 6.6 | 9.2 |
| Control¹ (no resin added) | | 42.6 | 46.0 | 1.0 | 1.4 |
| XIII | 1.00 | 66.6 | 67.0 | 17.0 | 18.0 |
| | 0.50 | 59.4 | 58.6 | 12.6 | 14.6 |
| | 0.25 | 54.6 | 58.4 | 7.0 | 10.0 |
| XIV | 1.00 | 60.6 | 63.0 | 11.8 | 14.4 |
| | 0.50 | 57.0 | 51.0 | 6.2 | 9.8 |
| | 0.25 | 52.6 | 54.0 | 3.8 | 5.6 |
| XV | 1.00 | 57.0 | 58.6 | 13.6 | 17.6 |
| | 0.50 | 59.6 | 59.4 | 11.2 | 14.6 |
| | 0.25 | 51.0 | 53.4 | 6.4 | 8.4 |
| XVI | 1.00 | 63.6 | 66.0 | 15.6 | 18.8 |
| | 0.50 | 52.6 | 55.0 | 10.8 | 12.2 |
| | 0.25 | 54.0 | 55.0 | 6.6 | 8.4 |

¹ In order to present valid comparative results, a control was included with each test series.

The results summarized above clearly indicate the improved dry and wet tensile strength imparted to paper by the novel resins of this invention.

EXAMPLE XXIII

This example illustrates the excellent pigment retention properties imparted to paper by the novel cationic resins of this invention.

The procedure employed was same as in Example XX. The results of these determinations were as follows:

| Resin example number | pH of the resin solution | Stock pH adjusted to a level of— | Percent resin, based on dry wt. of pulp | Retention of— | |
|---|---|---|---|---|---|
| | | | | TiO₂, percent | CaCO₃, percent |
| XI | 5.0 | 7.5 | 0.05 | 67.8 | |
| | | 7.5 | 0.02 | 56.8 | |
| | | 7.5 | 0.01 | 35.1 | |
| XVIII | 8.1 | 7.5 | 0.05 | 70.8 | |
| | | 7.5 | 0.02 | 61.7 | |
| | | 7.5 | 0.01 | 45.2 | |
| XVIII | 6.0 | 7.5 | 0.05 | 71.5 | |
| | | 7.5 | 0.02 | 60.3 | |
| | | 7.5 | 0.01 | 38.9 | |
| XVIII | 8.1 | 6.0 | 0.05 | 69.5 | |
| | | 4.6 | 0.05 | 64.6 | |
| | | 8.5 | 0.05 | 70.6 | |
| XVIII | 8.1 | 8.8 | 0.05 | | 63.6 |
| | | 8.8 | 0.02 | | 51.3 |
| | | 8.8 | 0.01 | | 26.5 |
| Control (no resin added) | | 7.5 | | 14.7 | |
| Do | | 8.8 | | | 10.4 |

The results summarized above clearly show the excellent pigment retention properties which are achieved with the novel resins of this invention.

EXAMPLE XXIV

This example illustrates the use of the novel resins of this invention as flocculants in the process of clarifying digested sludge.

The procedure employed was same as in Example XXI. The results of these determinations were as follows:

| Resin example number | pH of the resin solution | Percent resin, based on dry wt. of sludge | Volume of clear water (ml.) collected after | | |
|---|---|---|---|---|---|
| | | | 30 sec. | 60 sec. | 150 sec. |
| XI | 5.0 | 0.50 | 75 | 106 | 140 |
| | | 0.75 | 88 | 114 | 152 |
| XVIII | 8.1 | 0.50 | 80 | 108 | 145 |
| | | 0.75 | 95 | 116 | 155 |
| XVIII | 6.0 | 0.50 | 79 | 105 | 143 |
| | | 0.75 | 93 | 117 | 156 |
| Control | | ¹0.50 | 50 | 72 | 108 |
| | | ¹0.75 | 60 | 81 | 116 |

¹ Concentration of ferric chloride in mixture.

The results summarized above clearly indicate that the cationic polymers of this invention caused a major increase in the rate of filtration of the digested sludge.

Summarizing, it is thus seen that this invention provides for the preparation of novel, high molecular weight cationic resin compositions which exhibit excellent performance characteristics when utilized as strengthening and pigment retention agents in the paper making process and as flocculants for organic and inorganic materials.

Variations may be made in proportions, procedures and materials without departing from the scope of this invention which is defined by the following claims.

What is claimed is:

1. A chain extended, copolyamide-polyamine resin composition consisting essentially of the reaction product at 30°–100° C. of stoichiometric amounts of a chain extension reagent selected from the group consisting of epihalohydrins, 1,2-dichloroethane, 1,2-dichloropropane, 1,2-dichlorobutane, methylene - bis - acrylamide and sulfuryl chloride with a copolyamide-polyamine intermediate, said intermediate consisting essentially of the reaction product of:

(A) at least one compound selected from the group consisting of (1) a lactone corresponding to the formula

wherein R is a saturated, aliphatic, straight chain hydrocarbon radical containing from 2 to 18 carbon atoms and wherein the lactone ring contains from 4 to 20 members, and (2) an ester corresponding to the formula

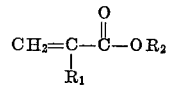

wherein $R_1$ is a hydrogen or methyl radical and $R_2$ is an alkyl radical containing from 1 to 4 carbon atoms; with (B) at least one polyalkylene polyamine corresponding to the formula $$H_2N-[(CH_2)_n-NR]_mH$$

wherein $n$ is an integer having a value of from 2 to 6 inclusive, $m$ is an integer having a value of from 1 to 6 inclusive, and R is selected from the group consisting of hydrogen atom and alkyl radical; and, (C) at least one carboxylic acid reagent selected from the group consisting of saturated dicarboxylic acids containing from 2 to 20 carbon atoms, alicyclic dicarboxylic acids, aromatic carbocyclic dicarboxylic acids, and the esters and anhydrides of these acids; the molar ratio of components (A):(B):(C) ranging from 0.01:1.5:0.99 to 1.0:1.0:0.01; said reaction between the lactone or ester and the polyalkylene polyamine being conducted at a temperature of 0°–390° C. for a period of ½ to 3 hours, with the resulting adduct being reacted with the carboxylic acid reagent at a temperature of 100°–275° C. for a period of ½ to 4 hours.

References Cited
UNITED STATES PATENTS

| | | | |
|---|---|---|---|
| 2,547,113 | 4/1951 | Drewitt et al. | 260—78 R |
| 3,224,893 | 12/1965 | Floyd et al. | 106—316 |
| 3,475,385 | 10/1969 | Goodman et al. | 260—78 R |
| 2,926,154 | 2/1960 | Keim | 260—78 SC |
| 3,125,552 | 3/1964 | Loshaek et al. | 260—78 SC |
| 3,320,215 | 5/1967 | Conte et al. | 260—78 SC |
| 3,329,657 | 7/1967 | Strazdins et al. | 260—78 SC |

HAROLD D. ANDERSON, Primary Examiner

U.S. Cl. X.R.

117—155 UA, 155 R; 162—164; 210—54; 260—18 N, 29.2 N, 29.6 H, 33.4 R, 72 N, 73 R, 78 UA, 78.3 UA, 78.3 R, 78.4 R, 78.4 ED, 830 P, 857 R

UNITED STATES PATENT OFFICE
CERTIFICATE OF CORRECTION

Patent No. 3,647,763　　　　　　　　　Dated March 7, 1972

Inventor(s) Hans H. Stockmann and Dilip K. Ray-Chaudhuri

It is certified that error appears in the above-identified patent and that said Letters Patent are hereby corrected as shown below:

Column 1, line 55, "are" should be: - - art - -

Column 3, line 52, "meth-" should be: - - methyl- - -

Column 6, line 20, "papr" should be: - - paper - -

Column 9, table marked STEP 1, in 8d., "dicarhoxylic" should be: - - dicarboxylic - -

Column 9, table marked STEP 2, in 10g., "stabilizer" should be: - - stabilized - -

Signed and sealed this 26th day of December 1972.

(SEAL)
Attest:

EDWARD M. FLETCHER, JR.　　　　　　　ROBERT GOTTSCHALK
Attesting Officer　　　　　　　　　　Commissioner of Patents